May 22, 1928.

L. SMITH

SHIPPING CRATE

Filed Feb. 28, 1927

1,670,752

Inventor:
Lester Smith

Patented May 22, 1928.

1,670,752

UNITED STATES PATENT OFFICE.

LESTER SMITH, OF PORT WASHINGTON, WISCONSIN, ASSIGNOR OF ONE-FOURTH TO DELOS H. SMITH, ONE-FOURTH TO DELIA B. SMITH, AND ONE-FOURTH TO OLIVER H. SMITH, ALL OF PORT WASHINGTON, WISCONSIN.

SHIPPING CRATE.

Application filed February 28, 1927. Serial No. 171,650.

This invention relates to shipping crates.

Objects of this invention are to provide a novel form of shipping crate which is adapted for the shipping of any desired material, but is particularly adapted for the shipping of perishable material, such, for example, as fish or other articles which are necessarily packed with ice during transit.

This invention is designed to provide dead air spaces around the ice packed material and is so constructed that the dead air spaces gradually increase in size towards the bottom of the device to provide a greater insulation as the ice melts and the material settles towards the bottom.

Further objects are to provide a novel means for compacting the ice and fish as the ice melts, so that the ice is laterally pressed inwardly as it settles and thus all spaces are taken up as the material settles, so that a solid mass is secured, although the material constantly changes its size due to the slow melting of the ice.

Further objects are to provide a construction which is very much cheaper to make than the previously known types of crates, although having the desirable characteristics noted above, and one which is so constructed that the partitions are readily detachable and may be detached and folded inwardly or else removed so that the device may be exposed to the sun or otherwise thoroughly dried or cleaned with the utmost facility to thus adapt it for repeated use.

An embodiment of the invention is shown in the accompanying drawings in which.

Figure 1:
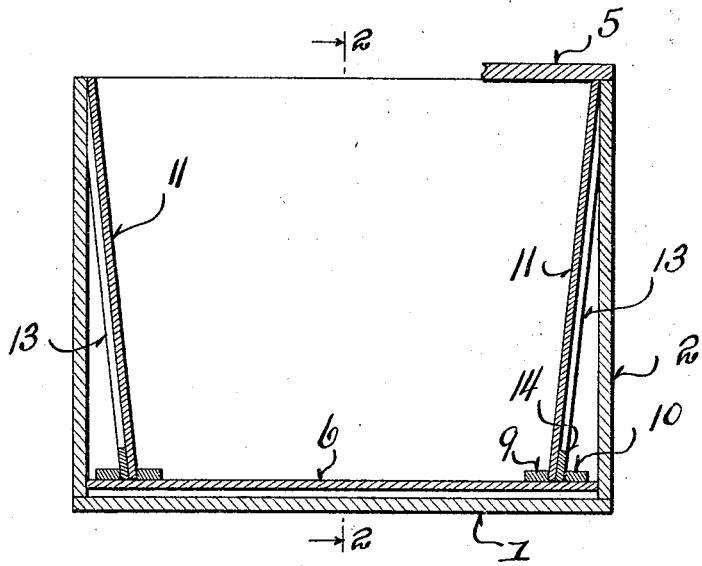
Figure 1 is a transverse sectional view through the shipping crate, such view corresponding to a section on the line 1—1 of Figure 2.
Figure 2:
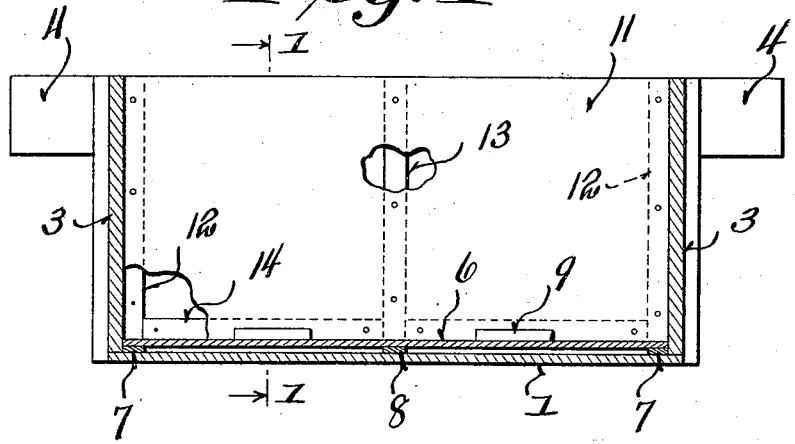
Figure 2 is a longitudinal sectional view through the crate corresponding to a section on the line 2—2 of Figure 1.

Referring to the drawings, it will be seen that the crate comprises a bottom portion 1, side portions 2, and end portions 3. Preferably, each side portion has an extended part 4 forming a handle to facilitate manipulation of the crate. A top 5 is adapted to be nailed down to the crate, as indicated in Figure 1.

The crate is provided with a removable bottom partition 6 which is equipped with a pair of end slats 7 and an intermediate slat 8. This bottom partition is thus spaced from the bottom of the crate and provides a dead air space around the packed material. The bottom partition is provided with a plurality of inner and outer blocks 9 and 10, as shown most clearly in Figure 1, which are arranged in pairs and spaced apart. These blocks are positioned inwardly a slight distance from the marginal edge or side edge of the bottom partition 6.

The side partitions 11 are arranged in a slanting manner and are provided with end slats 12, and an intermediate slat 13, and with a bottom slat 14. The bottom of the side partitions and the bottom slat 14 are received between the series of blocks 9 and 10, while the upper edge of each of the side partitions contacts with the upper edge of the sides 2 of the crate.

Figure 3:
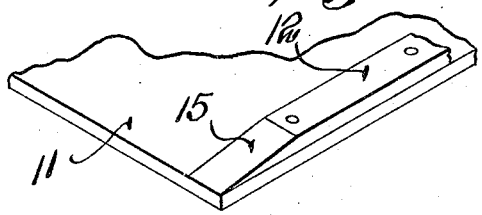
Figure 3 is a fragmentary perspective view of one of the partitions.

It is to be noted from Figures 1 and 3 that the side partitions 11 have the upper ends of the cleats 12 and 13 bevelled, as indicated at 15, to contact properly with the inner face of the side walls 2.

The crate is assembled by putting the board in place and thereafter slipping the slanting side partitions downwardly, into the position shown in Figure 1. Thereafter, a layer of ice is placed on the bottom partition and the fish is then placed on the ice. Ice is then placed around the sides of the fish and over the top and the cover or top 5 of the crate is nailed in place. This cover keeps the side partitions from shifting and holds the parts in their assembled position.

During shipping, the ice necessarily melts somewhat and would, under the usual conditions, allow cavities to be formed about the fish with consequent deterioration of the fish. However, with this invention, as the ice melts, it settles down and, due to the slanting side walls or partitions, is laterally compressed to thus compact the mass and keep any cavities from being formed.

It is apparent that the inner blocks 9 could be omitted, if desired, as the weight of the material will hold the bottom ends of the partitions 11 outwardly.

Further, it may be found that a few nails driven into the bottom 6 on opposite sides of the side partitions will serve in place of the blocks 9 and 10.

It is to be noted further that although the sides only have been shown in detail as slanting inwardly, that obviously, end partitions could be employed also which would then similarly slant inwardly, as described in connection with the side partitions. Obviously, these end partitions would preferably be tapered or else the end edges of the side partitions would be tapered.

Although the invention has been described in considerable detail, such description is intended as illustrative rather than limiting as the invention may be variously embodied and as the scope of such invention is to be determined as claimed.

I claim:

A shipping crate comprising a box-like body portion, a bottom partition spaced from the bottom of said body portion and having a plurality of holding members spaced inwardly from its edges, a plurality of downwardly and inwardly slanting partitions having their lower ends held against displacement by said holding members and having reenforcing slats secured to the outer sides of such partitions, said reenforcing slats having bevelled upper ends, said slanting partitions contacting with the upper portion of the side walls of said crate, and a removable top secured to said body portion.

In testimony that I claim the foregoing I have hereunto set my hand at Port Washington, in the county of Ozaukee and State of Wisconsin.

LESTER SMITH.